United States Patent
Elzur et al.

(10) Patent No.: US 7,853,691 B2
(45) Date of Patent: Dec. 14, 2010

(54) METHOD AND SYSTEM FOR SECURING A NETWORK UTILIZING IPSEC AND MACSEC PROTOCOLS

(75) Inventors: Uri Elzur, Irvine, CA (US); Bora Akyol, San Jose, CA (US); Zheng Qi, San Jose, CA (US); Mark Buer, Gilbert, AZ (US); Ford Tamer, Hillsborough, CA (US); Yongbum Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 225 days.

(21) Appl. No.: 11/934,257

(22) Filed: Nov. 2, 2007

(65) Prior Publication Data

US 2008/0126559 A1 May 29, 2008

Related U.S. Application Data

(60) Provisional application No. 60/867,744, filed on Nov. 29, 2006.

(51) Int. Cl.
*G06F 15/173* (2006.01)
*G06F 15/16* (2006.01)
*G06F 7/04* (2006.01)
*H04L 9/08* (2006.01)

(52) U.S. Cl. .................. 709/225; 709/236; 726/2; 380/283

(58) Field of Classification Search .......... 709/232
See application file for complete search history.

(56) References Cited

U.S. PATENT DOCUMENTS

| | | | | |
|---|---|---|---|---|
| 6,055,543 | A * | 4/2000 | Christensen et al. ............ 1/1 |
| 6,708,218 | B1 * | 3/2004 | Ellington et al. ............ 709/236 |
| 7,047,241 | B1 * | 5/2006 | Erickson ............ 1/1 |
| 7,143,188 | B2 * | 11/2006 | Maufer et al. ............ 709/245 |
| 7,388,844 | B1 * | 6/2008 | Brown et al. ............ 370/252 |
| 7,480,907 | B1 * | 1/2009 | Marolia et al. ............ 717/174 |
| 7,523,485 | B1 * | 4/2009 | Kwan ............ 726/2 |
| 2001/0047474 | A1 * | 11/2001 | Takagi et al. ............ 713/151 |
| 2002/0035699 | A1 * | 3/2002 | Crosbie ............ 713/201 |

(Continued)

OTHER PUBLICATIONS

Y(J) Stein, Pseudowire Security (PWsec), draft-stein-pwe3-pwsec-00.txt, Oct. 13, 2006.*

(Continued)

*Primary Examiner*—Saleh Najjar
*Assistant Examiner*—Robert Shaw
(74) *Attorney, Agent, or Firm*—McAndrews, Held & Malloy, Ltd.

(57) ABSTRACT

Aspects of a method and system for securing a network utilizing IPsec and MACsec protocols are provided. In one or more network nodes, aspects of the invention may enable conversion between Ethernet packets comprising payloads secured utilizing IPsec protocols and Ethernet packets secured utilizing MACsec protocols. For example, IPsec connections may be terminated at an ingress network node and IPsec connections may be regenerated at an egress network node. Packets secured utilizing MACsec protocols may be detected based on an Ethertype. Packets comprising payloads secured utilizing IPsec protocols may be detected based on a protocol field or a next header field. The conversion may be based on a data structure stored by and/or accessible to the network nodes. Aspects of the invention may enable securing data utilizing MACsec protocols when tunneling IPsec secured data through non-IPsec enabled nodes.

66 Claims, 11 Drawing Sheets

U.S. PATENT DOCUMENTS

| | | | |
|---|---|---|---|
| 2002/0044567 A1* | 4/2002 | Voit et al. ................... | 370/467 |
| 2002/0133491 A1* | 9/2002 | Sim et al. ..................... | 707/10 |
| 2003/0093476 A1* | 5/2003 | Syed .......................... | 709/204 |
| 2003/0135616 A1* | 7/2003 | Carrico et al. .............. | 709/225 |
| 2003/0149742 A1* | 8/2003 | Bollerud ..................... | 709/217 |
| 2003/0182431 A1* | 9/2003 | Sturniolo et al. ............ | 709/227 |
| 2003/0233576 A1* | 12/2003 | Maufer et al. ............... | 713/201 |
| 2004/0068532 A1* | 4/2004 | Dewing et al. .............. | 709/200 |
| 2004/0083295 A1* | 4/2004 | Amara et al. ............... | 709/229 |
| 2004/0143734 A1* | 7/2004 | Buer et al. .................. | 713/153 |
| 2004/0165588 A1* | 8/2004 | Pandya ....................... | 370/389 |
| 2004/0246376 A1* | 12/2004 | Sekiguchi et al. ........... | 348/468 |
| 2004/0254883 A1* | 12/2004 | Kondrk et al. ............... | 705/51 |
| 2005/0163078 A1* | 7/2005 | Oba et al. .................... | 370/331 |
| 2005/0177722 A1* | 8/2005 | Vaarala et al. .............. | 713/168 |
| 2005/0198691 A1* | 9/2005 | Xiang et al. .................. | 726/3 |
| 2005/0273853 A1* | 12/2005 | Oba et al. .................... | 726/22 |
| 2006/0014547 A1* | 1/2006 | Walter ..................... | 455/456.1 |
| 2006/0041748 A1* | 2/2006 | Lockhart et al. ............ | 713/168 |
| 2006/0053077 A1* | 3/2006 | Mourad et al. ............... | 705/51 |
| 2006/0104262 A1* | 5/2006 | Kant et al. ................... | 370/352 |
| 2006/0112431 A1* | 5/2006 | Finn et al. ..................... | 726/22 |
| 2006/0136715 A1* | 6/2006 | Han et al. .................... | 713/151 |
| 2006/0179307 A1* | 8/2006 | Stieglitz et al. ............. | 713/168 |
| 2006/0259759 A1* | 11/2006 | Maino et al. ................. | 713/151 |
| 2007/0036145 A1* | 2/2007 | Riley et al. .................. | 370/352 |
| 2007/0055891 A1* | 3/2007 | Plotkin et al. ............... | 713/189 |
| 2007/0064647 A1* | 3/2007 | Prasad ........................ | 370/331 |
| 2007/0110009 A1* | 5/2007 | Bachmann et al. .......... | 370/338 |
| 2007/0136327 A1* | 6/2007 | Kim et al. .................... | 707/100 |
| 2007/0226810 A1* | 9/2007 | Hotti ........................... | 726/30 |
| 2007/0268888 A1* | 11/2007 | Shatzkamer et al. ........ | 370/352 |
| 2008/0037452 A1* | 2/2008 | Tunmer et al. .............. | 370/310 |
| 2008/0065699 A1* | 3/2008 | Bloebaum et al. ........... | 707/200 |
| 2008/0075073 A1* | 3/2008 | Swartz ........................ | 370/389 |
| 2008/0130894 A1* | 6/2008 | Qj et al. ...................... | 380/277 |
| 2009/0210250 A1* | 8/2009 | Prax et al. ....................... | 705/3 |

OTHER PUBLICATIONS

IEEE Std 801.1AE-2006 Media Access Control (MAC) Security, Aug. 18, 2006.*

Kent & Atkinson, IP Encapsulating Security Payload (ESP), RFC 2406, Nov. 1998.*

Viega & McGrew, The Use of Galois/Counter Mode (GCM) in IPsec Encapsulating Security Payload (ESP), RFC 4106, Jun. 2005.*

The Use of Galois Message Authentication Code (GMAC) in IPsec ESP and AH, RFC 4543, May 2006.*

* cited by examiner

METHOD AND SYSTEM FOR SECURING A NETWORK UTILIZING IPSEC AND MACSEC PROTOCOLS

CROSS-REFERENCE TO RELATED APPLICATIONS/INCORPORATION BY REFERENCE

This patent application makes reference to, claims priority to and claims the benefit of U.S. Provisional Patent Application Ser. No. 60/867,744 filed on Nov. 29, 2006.

The above stated application is hereby incorporated herein by reference in its entirety.

FIELD OF THE INVENTION

Certain embodiments of the invention relate to computer networking. More specifically, certain embodiments of the invention relate to a method and system for securing a network utilizing IPsec and MACsec protocols.

BACKGROUND OF THE INVENTION

A computer network is a collection of two or more computing nodes, which are communicatively coupled via a transmission medium and utilized for transmitting information. Most networks adhere to the layered approach provided by the open systems interconnect (OSI) reference model. The OSI reference provides a seven (7) layer approach, which includes an application layer, (Layer 7), a presentation layer (layer 6), a session layer (Layer 5), a transport layer (Layer 4), a network layer (Layer 3), a data link layer (Layer 2) and a physical layer (Layer 1). Layer 7 through layer 5 inclusive may comprise upper layer protocols, while layer 4 through layer 1 may comprise lower layer protocols. These seven layers can be broken down into a fairly specific set of responsibilities or services, which they provide.

Layer 7, the application layer, is typically responsible for supporting network applications such as web browsers and email clients, and is typically implemented in software in end systems such as personal computers and servers. Typical layer 7 protocols comprise HTTP to support the World Wide Web, and SMTP to support electronic mail.

Layer 6, the presentation layer, is typically responsible for masking any differences in data formats that may occur between dissimilar or disparate systems. The presentation layer specifies architecture independent data transfer formats and may enable encoding, decoding, encryption, decryption, compression and/or decompression of data.

Layer 5, the session layer, is typically responsible for managing user session dialogues. In this regard, the session layer may be enabled to control establishment and/or termination of logical links between users. The session layer may also be enabled to provide handling and reporting of upper layer errors.

Layer 4, the transport layer, is typically responsible for passing application layer messages between the client and server sides of an application. In this regard, the transport layer may be enabled to manage end-to-end delivery of messages in the network. The transport layer may comprise various error recovery and/or flow control mechanisms, which may provide reliable delivery of messages. By far the two most common Layer 4 protocols are transmission control protocol (TCP) and user datagram protocol (UDP), which are used in the Internet.

Layer 3, the network layer, is typically responsible for determining how data may be transferred between network devices. Data may be routed according to unique network addresses. In this regard, the network layer may route, for example, datagrams between end systems. Internet Protocol (IP), for example, defines the form and content of the datagrams and is implemented in Layer 3 in combination with any number of routing protocols which may be implemented in the various nodes (devices such as bridges and routers) along a datagram's path from one end system to another.

Layer 2, the data link layer, is typically responsible for moving a packet of data from one node to another. The data link layer defines various procedures and mechanisms for operating communication links and may enable, for example, the framing of packets within the network. The data link layer may enable detection and/or correction of packet errors. The Ethernet (IEEE 802.3) protocol is one common link layer protocol that is used in modern computer networks.

Layer 1, the physical layer, is typically responsible for defining the physical means, which may comprise optical, electrical and/or mechanical means for communicating data via network devices over a communication medium. The converting the bit stream from Layer 2 into a series of physical signals for transmission over a medium. Layer 2 technologies such as Ethernet may implement a number of Layer 1 protocols depending on whether the signal is to be transmitted over twisted-pair cabling or over-the-air for example.

At Layer 3, today's enterprise networks predominantly utilize the Internet Protocol (IP). To enhance network security at Layer 3, a suite of protocols collectively referred to as IPsec was developed and is utilized along with one or more key exchange protocols as a way to provide source authentication, data integrity, and/or data confidentiality of IP datagrams transmitted in a network. In this regard, IPsec may provide end-to-end security of data in a network.

When utilizing IPsec, a source node must first establish a logical connection, known as a security association (SA), with a destination node. A security association is a unidirectional connection between the two end nodes and is characterized by the security protocol identifier (AH or ESP), the destination IP address, and a security parameter index (SPI). In this manner, the source node can transmit secure data over the network to the destination node utilizing either the Authentication Header (AH) protocol or the Encrypted Security Payload (ESP) protocol.

At Layer 2, today's enterprise networks are based predominantly on IEEE 802.3 Ethernet technology. While Ethernet offers ubiquitous and inexpensive connectivity to the Enterprise, it is not particularly strong in controlling access to that network. Although IEEE has attempted to improve access control for wired Ethernet with the IEEE 802.1x standard, this standard did not receive widespread adoption due to a number of reasons. One of these negative factors related to IEEE 802.1x deployment was the fact that 802.1x only validated the users as they signed onto the network and it adhered to the one device per port model. There was no per-packet validation, neither was there any standardized method of implementing access control while supporting more than one device per port. Vendors did provide non-standardized means to provide the latter, but the former remained unimplemented.

IEEE standards 802.1AE, 802.1af, and 802.1ar form the basis of a new architecture for network access control for Ethernet networks. These three standards form a replacement for the existing IEEE 802.1x based access control mechanisms. The IEEE 802.1AE (MACsec) standard defines the data link layer encryption and authentication mechanisms. Used in conjunction with 802.1AE, the IEEE 802.1ar standard defines a per-device secure identifier (DevIDs), and IEEE 802.1af defines and recommends procedures to use the DevIDs in an authentication process.

MACSec integrates security into wired Ethernet by identifying the devices connecting to a LAN and classifying the devices as authorized or unauthorized. Exemplary network devices that may be identified and classified comprise computers, wireless access points, servers, VOIP telephones, routers, switches, bridges and hubs.

Although the IPsec and MACsec protocols are both trying to accomplish data security in a network, they do so in slightly different ways and at different network abstraction layers. In this manner, nodes in a hybrid network employing IPsec protocols and MACsec protocols may not be able to provide all the network services users have come to expect out of networks. For example, a node in a hybrid network may be unable to view packet payload and/or classify traffic arriving at the node due to incompatibility with one or more security protocols being utilized in the packet.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided securing a network utilizing IPsec and MACsec protocols, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for securing a network utilizing IPsec and MACsec protocols. In this regard, a network may utilize IPSec and/or MACsec protocols such that existing network infrastructure may be preserved while still providing data authentication or integrity, and/or data confidentiality.

Aspects of a method and system for securing a network utilizing IPsec and MACsec protocols are provided. In one or more network nodes, aspects of the invention may enable conversion between Ethernet packets comprising payloads secured utilizing IPsec protocols and Ethernet packets secured utilizing MACsec protocols. For example, IPsec connections may be terminated at an ingress network node and IPsec connections may be regenerated at an egress network node. Packets secured utilizing MACsec protocols may be detected based on an Ethertype. Packets comprising payloads secured utilizing IPsec protocols may be detected based on a protocol field or a next header field or based on out of band information (e.g., source and destination addresses and flows involved or SA information). The conversion may be based on a data structure stored by and/or accessible to the network nodes. Boundaries between networks utilizing different security protocols may be discovered and may enable determining which network nodes need to perform a conversion. Additionally, aspects of the invention may enable securing data utilizing MACsec protocols when tunneling IPsec secured data through non-IPsec enabled nodes.

Figure 1A:
FIG. 1A is a diagram of exemplary "standard" IPv4 datagrams, in connection with an embodiment of the invention.

FIG. 1A is a diagram of exemplary IPv4 datagram, in connection with an embodiment of the invention. Referring to FIG. 1A, the IPv4 datagram 101 may comprise an IP header 102 and a payload 104.

The IP header 102 may comprise control information utilized to route the IP datagram from a source IP address to a destination IP address. The payload 104 may comprise data passed down from any number of Layer 4 protocols, such as TCP.

The IPv4 datagram 101 may be utilized to transmit information over a network. However, by itself, the datagram 101 may be unsecured and thus may be inadequate for transmitting information in certain applications. Accordingly, various embodiments of the invention may augment the security of the information comprising the datagram 101 at the data link layer. Moreover, aspects of the invention may make more network services, such as traffic classification and/or payload inspection, available for processing the datagram 101. Furthermore, aspects of the invention may enable transmitting the datagram 101 in a hybrid network utilizing IPsec and MACsec protocols.

Figure 1B:
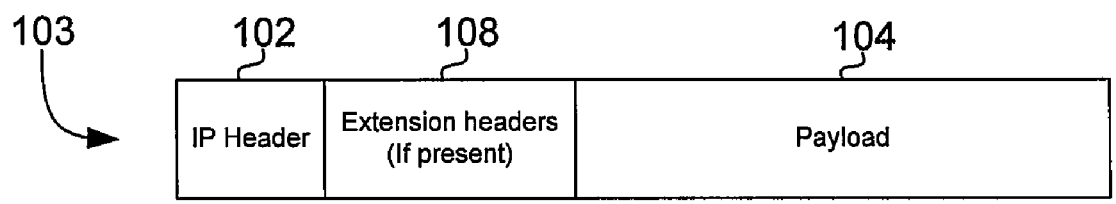
FIG. 1B is a diagram of exemplary "standard" IPv6 datagrams, in connection with an embodiment of the invention.

FIG. 1B is a diagram of exemplary IPv6 datagram, in connection with an embodiment of the invention. Referring to FIG. 1B, the IPv6 datagram 103 may comprise an IP header 102, a payload 104, and one or more extension headers 108.

The IP header 102 may comprise control information utilized to route the IP datagram from a source IP address to a destination IP address. The payload 104 may comprise data passed down from any number of Layer 4 protocols, such as TCP. The extension headers 106 may comprise additional control information utilized in routing and/or processing the IP datagram 103.

The IPv6 datagram 103 may be utilized to transmit information over a network. However, by itself, the datagram 103 may be unsecured and thus may be inadequate for transmitting information in certain applications. Accordingly, various embodiments of the invention may augment the security of the information comprising the datagram 101 at the data link layer. Moreover, aspects of the invention may make more network services, such as traffic classification and/or payload inspection, available for processing the datagram 103. Furthermore, aspects of the invention may enable transmitting the datagram 103 in a hybrid network utilizing IPsec and MACsec protocols.

Figure 1C:
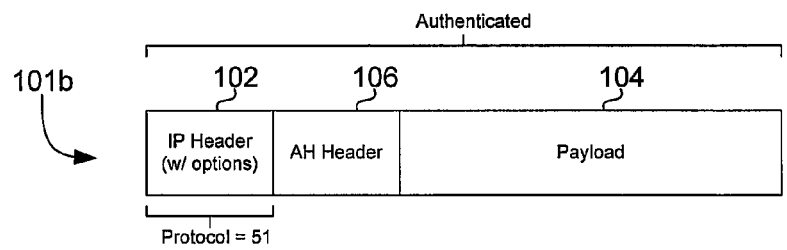
FIG. 1C is a diagram of exemplary IPv4 and IPv6 datagrams secured utilizing the authentication header (AH) protocol for transmission utilizing a security association (SA), in connection with an embodiment of the invention.

FIG. 1C is a diagram of exemplary IPv4 datagrams secured utilizing the authentication header (AH) protocol for transmission utilizing a security association (SA), in connection with an embodiment of the invention. Referring to FIG. 1C, in comparison to the datagram 101, the datagram 101b may additionally comprise an AH header 106.

The AH header 106 may comprise information utilized by the receiver to identify the SA, and corresponding information, associated with the datagram 101b, validate and authenticate the IP datagram 101b, and determine how to process the IPsec layer of the datagram 101b. In this regard, the transmitter generating the IP datagram 101b may determine a SA associated with the datagram 101b and may utilize the SA to generate the AH header 106. In this manner, various embodiments of the invention may utilize datagrams in the format of the datagram 101b to transmit information securely over a network.

Figure 1D:
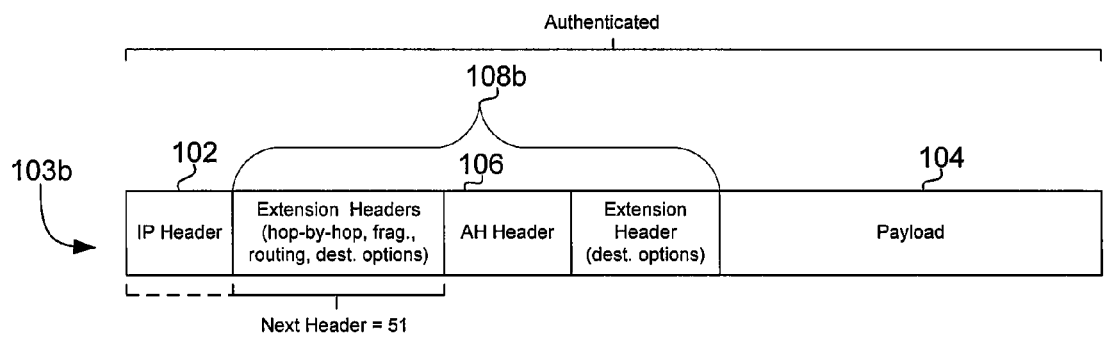
FIG. 1D is a diagram of exemplary IPv6 datagrams secured utilizing the authentication header (AH) protocol for transmission utilizing a security association (SA), in connection with an embodiment of the invention.

FIG. 1D is a diagram of an exemplary IPv6 datagram secured utilizing the authentication header (AH) protocol for transmission utilizing a security association (SA), in connection with an embodiment of the invention. Referring to FIG. 1D, in comparison to the datagram 103, the extension headers 108b comprising the datagram 103b may comprise an AH header 106. Moreover, the presence of an AH header 106 may be indicated by a value of 51 in the "next header" field of a header immediately preceding the AH header. In this manner, the headers of the IPv6 datagram 103b may be a sort of chain with the "next header" field of each header indicating the type of an immediately subsequent header. For example, if the AH header 106 is the only extension header, the "next header" field of the IP header 102 may comprise a value of 51.

The AH header 106 may comprise information utilized by the receiver to identify the SA, and corresponding information, associated with the datagram 101b, validate and authenticate the IP datagram 103b, and determine how to process the IPsec layer of the datagram 103b. In this regard, the transmitter generating the IP datagram 103b may determine a SA associated with the datagram 103b and may utilize the SA to generate the AH header 106. In this manner, various embodiments of the invention may utilize datagrams in the format of the datagram 103b to transmit information securely over a network.

Figure 1E:
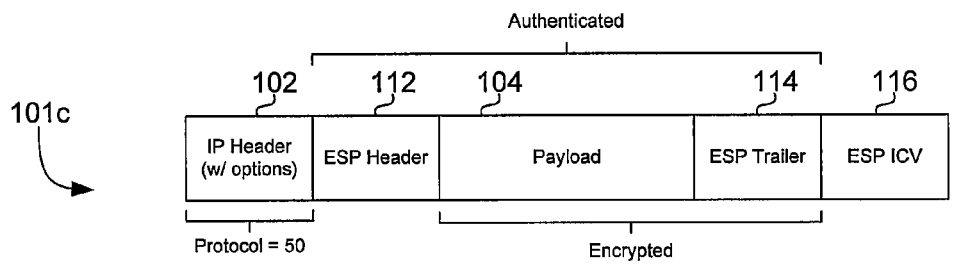
FIG. 1E is a diagram of exemplary IPv4 datagrams secured utilizing the encapsulated security payload (ESP) protocol for transmission utilizing a security association (SA), in connection with an embodiment of the invention.

FIG. 1E is a diagram of exemplary IPv4 datagrams secured utilizing the encapsulated security payload (ESP) protocol for transmission utilizing a security association (SA), in connection with an embodiment of the invention. Referring to FIG. 1E, in comparison to the datagrams 101, the datagrams 101c may additionally comprise an ESP header 112, an ESP trailer 114, and an ESP integrity check value (ICV) 116.

The ESP header 112 may comprise information utilized by the receiver to identify the SA, and corresponding information, associated with the datagram 101 c, validate and authenticate the IP datagram 101c, and determine how to process the IPsec layer of the datagram 101c. In this regard, the transmitter generating the IP datagram 101c may determine a SA associated with the datagram 101c and may utilize the SA to generate the ESP header 112, the ESP trailer 114, and/or the ESP ICV 116. The ESP trailer 114 may comprise information that may be utilized in determining how to process the datagrams 101c. The ESP ICV 166 may comprise information that may be utilized to validate the contents of the IP datagram 101c. In this manner, various embodiments of the invention may utilize datagrams in the format of the datagram 103c to transmit information securely over a network.

In operation, some IP datagrams may be secured utilizing a combination of the AH header 106 described in FIG. 1C and the ESP header 112 described in FIG. 1E. In this regard, some or all of the information and/or formatting described above for the ESP header 112 and AH header 106 may be combined into a single datagram.

Figure 1F:
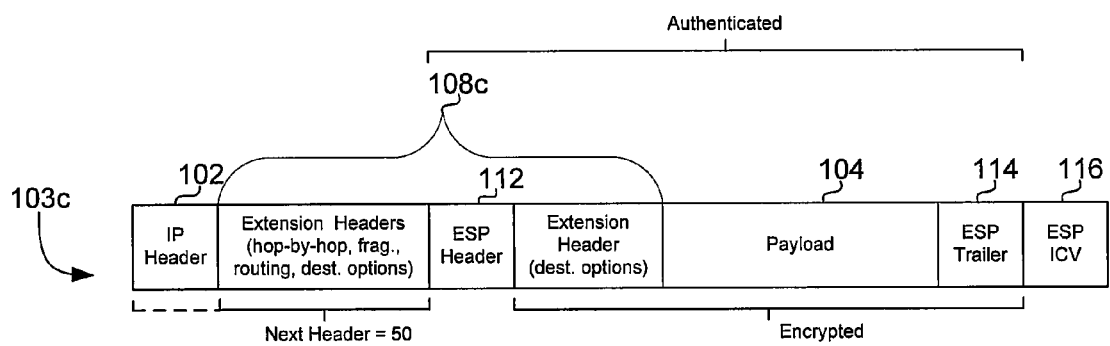
FIG. 1F is a diagram of exemplary IPv6 datagrams secured utilizing the encapsulated security payload (ESP) protocol for transmission utilizing a security association (SA), in connection with an embodiment of the invention.

FIG. 1F is a diagram of an exemplary IPv6 datagram 103c secured utilizing the encapsulated security payload (ESP) protocol for transmission utilizing a security association (SA), in connection with an embodiment of the invention. Referring to FIG. 1F, in comparison to the datagram 103, the extension headers 103c comprising the datagram 103c may comprise an ESP header 112. Moreover, the presence of an ESP header 112 may be indicated by a value of 50 in the "next header" field of a header immediately preceding the ESP header 112. In this manner, the headers of the IPv6 datagram may be a sort of chain with the "next header" field of each header indicating the type of the subsequent header. For example, in the case that the ESP header 112 is the only extension header, the "next header" of the IP header 102 may comprise a "next header" field of 50.

The ESP header 112 may comprise information utilized by the receiver to identify the SA, and corresponding information, associated with the datagram 103c, validate and authenticate the IP datagram 103c, and determine how to process the IPsec layer of the datagram 103c. In this regard, the transmitter generating the IP datagram 103c may determine a SA associated with the datagram 103c and may utilize the SA to generate the ESP header 112, the ESP trailer 114, and the ESP ICV 116. The ESP trailer 114 may comprise information that may be utilized in determining how to process the datagrams 103c. The ESP ICV 166 may comprise information that may be utilized to validate the contents of the IP datagram 103c. In this manner, various embodiments of the invention may utilize datagrams in the format of the datagram 103c to transmit information securely over a network.

In operation, some IP datagrams may be secured utilizing a combination of the AH header 106 described in FIG. 1D and the ESP header 112 described in FIG. 1F. In this regard, some or all of the information and/or formatting described above for the ESP header 112 and AH header 106 may be combined into a single datagram.

Figure 2A:
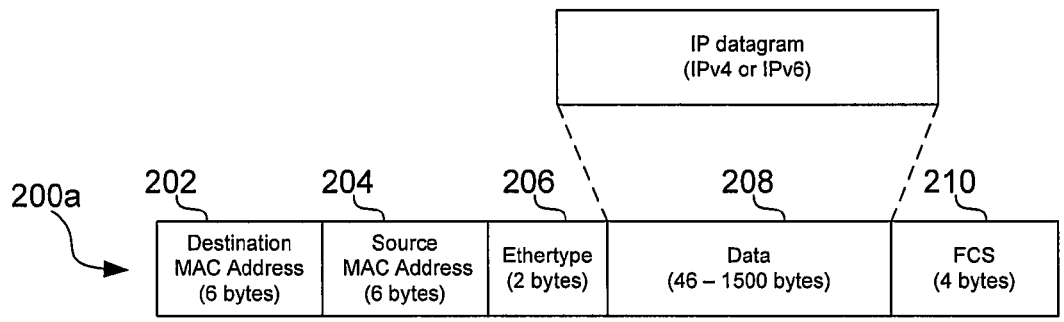
FIG. 2A is a diagram of an exemplary Ethernet packet, in connection with an embodiment of the invention.

FIG. 2A is a diagram of an exemplary Ethernet packet, in connection with an embodiment of the invention. Referring to FIG. 2A, the Ethernet packet may comprise a destination MAC address field 202, a source MAC address field 204, an Ethertype field 206, a data field 208, and a frame check sequence (FCS) 210.

The destination MAC address field 202 may comprise information that may be utilized to identify the node that the packet is to be sent to. The source MAC address 204 field may comprise information that may be utilized to identify the node that originated the packet. The Ethertype field 206 may comprise information that may be utilized to identify the protocol (e.g. IPv4 or IPv6) being transported in the packet. The data field 208 may contain the data being transmitted. The FCS 210 may comprise information that may be utilized to provide error detection for the packet.

In operation, when a packet such as the Ethernet packet 200a arrives at a network node, the node may be enabled to parse one or more fields of the packet to determine a manner in which the packet may be handled. In this regard, the node may be a network switch, which may be enabled to parse the source MAC address 202 and the destination MAC address 204 to determine an interface onto which to forward the packet. Alternatively, the node may be an end system and may parse the Ethertype field 206 to determine which network layer protocol to pass the data up to. Exemplary Ethertypes may comprise 0x0800 for Internet protocol Version 4 (IPv4), 0x0806 for Address Resolution Protocol (ARP), and 0x86DD for IPv6.

Figure 2B:
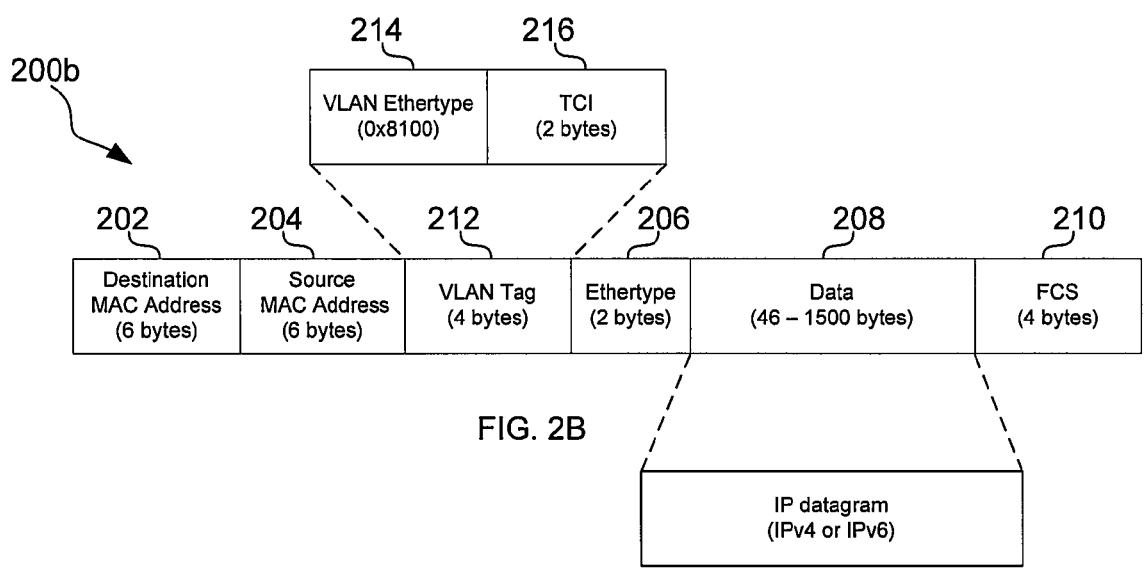
FIG. 2B is a diagram of an exemplary VLAN tagged Ethernet packet, in connection with an embodiment of the invention.

FIG. 2B is a diagram of an exemplary VLAN tagged Ethernet packet 200b, in connection with an embodiment of the invention. Referring to FIG. 2A, the VLAN tagged Ethernet packet 200b may comprise a VLAN tag 212 inserted after the source MAC address 204 and before the Ethertype field 206.

The VLAN tag 212 may comprise a VLAN Ethertype 214 and a tag control information (TCI) field 216. The VLAN Ethertype 214 may comprise a numerical identifier which may indicate that the packet has been VLAN tagged and may be parsed accordingly. An exemplary numerical identifier may comprise 0x8100. The TCI field 216 may comprise two bytes of information which serve multiple functions. First, the TCI field 216 may be utilized to determine a priority level for the packet. Second, the TCI field 216 may comprise a numerical identifier of the VLAN to which the packet belongs.

In this regard, the VLAN tagged packet 200b may comprise an altered structure as compared to the Ethernet packet 200a and a network node may thus need a way to identify the format of a received packet so that the packet may be parsed properly. Accordingly, the VLAN Ethertype 214 may be utilized to indicate to the network node that the packet may be a VLAN tagged packet.

In operation, when a packet such as the VLAN tagged packet 200b arrives at a network node, the node may parse one or more fields of the packet to determine a manner in which the packet may be handled. In this regard, the node may be a network switch, which may be enabled to parse the VLAN tag 212 to determine a VLAN to which the packet may belong. In this manner, the node may be enabled to determine an interface (possibly multiple interfaces in the case of some multicast or broadcast packets) onto which to forward the packet. Alternatively, the node may be an end system and may parse the Ethertype field 206 to determine which network layer protocol to pass the data up to. Exemplary Ethertypes may comprise 0x0800 for Internet protocol Version 4 (IPv4), 0x0806 for Address Resolution Protocol (ARP), and 0x86DD for IPv6.

Figure 2C:
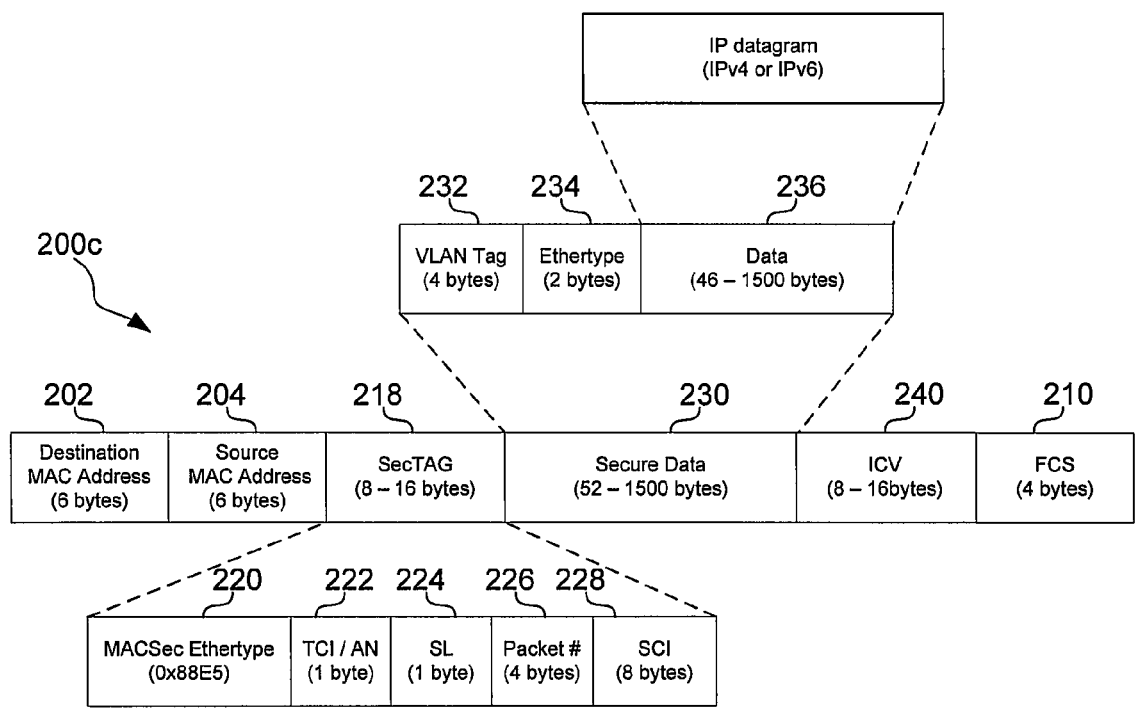
FIG. 2C is a diagram of an exemplary MACSec secured packet, in connection with an embodiment of the invention.

FIG. 2C is a diagram of an exemplary MACSec secured Ethernet packet 200c, in connection with an embodiment of the invention. Referring to FIG. 2C, the MACSec packet 200c may comprise a security tag (SecTAG) 218, a secure data field 230, and an integrity check value (ICV) 240.

The security tag (SecTAG) 218 may be inserted after the source MAC address field 204 and may comprise a MACSec Ethertype 220, a TCI/AN field 222, a SL field 224, a packet number field 226, and a secure channel identifier (SCI) field 228. The MACSec Ethertype 220 may comprise a numerical identifier, 0x88E5, which may indicate that the packet is a MACSec packet and may be parsed accordingly. The TCI/AN field 222 may comprise information that may be utilized to determine a version of the MACSec protocol utilized in the packet and may comprise information that may be utilized to transmit the packet over a secure channel. The SL field 224 may comprise information that may be utilized to determine the number of bytes between the last byte of the SecTAG and the first byte of the ICV 240. The packet number field 226 may comprise a monotonically increasing value to prevent against "replay" attacks. The SCI field 228 may comprise information that may be utilized to identify the source address and port that transmitted the packet.

The secure data field 230 may comprise a VLAN tag 232, an Ethertype 234, and a data field 236. The VLAN tag 232 may comprise information similar to that of the VLAN tag 212 in FIG. 2B, with the difference that the VLAN tag 232 may be encrypted. The Ethertype 234 may comprise information similar to that of the Ethertype 206 in FIG. 2A, with the difference that the Ethertype 234 may be encrypted. The data field 236 may comprise information similar to that of the data field 208 in FIG. 2A, with the difference that the data field 236 may be encrypted.

The integrity check value (ICV) 240 may comprise information that may be utilized to verify the integrity of the packet 200c. The FCS 238 may comprise information similar to that of the FCS 210 in FIG. 2A.

The MACSec secured Ethernet packet 200c may have an altered format (including size) as compared to the packets 200a and 200b. A network node may thus need a way to identify the format of a received packet so that the packet may be parsed properly. Accordingly, a value of the MACSec Ethertype 220 may indicate to the network node that the packet is a MACSec packet.

Additionally, because a MACsec packet may have an altered format and/or different values in known fields (e.g. Ethertype) as compared to a standard Ethernet packet, it may be important to know which nodes in a network are currently MACsec capable and/or have MACsec capabilities enabled. Therefore, in accordance with an embodiment of the invention, information as to the MACsec capabilities of various network nodes may be utilized to determine network nodes and/or network boundaries where MACsec should be utilized and where IPsec should be utilized. Accordingly, this information may be provided to and/or stored in the network nodes.

Figure 3A:
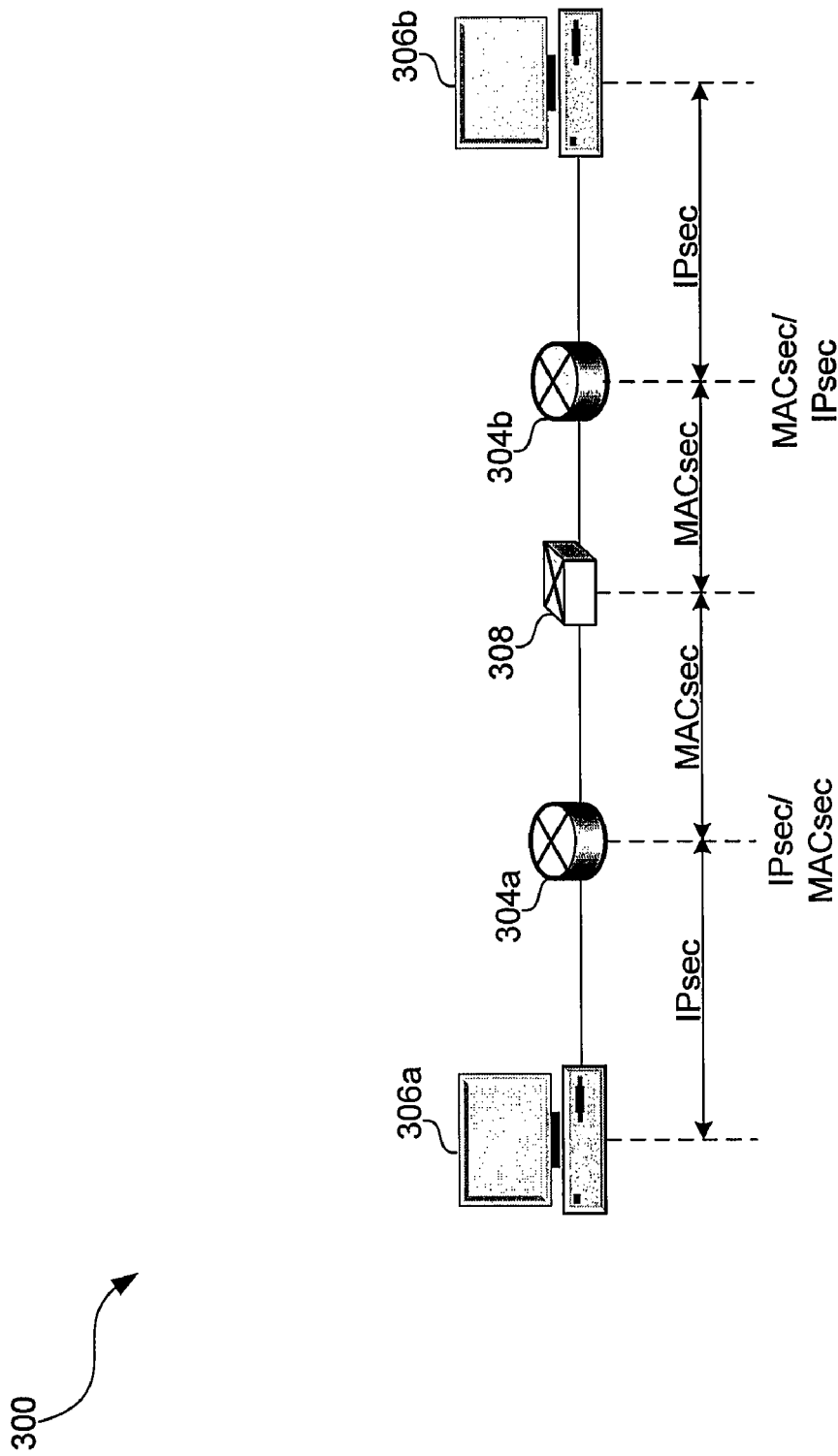
FIG. 3A is a diagram of an exemplary network utilizing both MACsec and IPsec protocols, in accordance with an embodiment of the invention.

FIG. 3A is a diagram of an exemplary network 300 utilizing both MACsec and IPsec protocols, in accordance with an embodiment of the invention. Referring to FIG. 3A the network may comprise end systems 306a, 306b, edge nodes 304a, 304b, and core node 308.

The end systems 306a, 306b may comprise suitable logic, circuitry, and/or code that may enable generation and/or transmission of messages to the network 300. In this regard, the end systems 306a, 306b may enable the generation of one or more IPsec secured datagrams, such as the datagrams in FIGS. 1B and 1C. Additionally, the end systems 306a, 306b may enable the encapsulation of the IPsec secured datagrams into one or more Ethernet packets, such as the packets in FIGS. 2A through 2C. Also, the end systems 306a, 306b may enable receiving and/or processing Ethernet packets comprising an IPsec secured datagram. In this regard, the end systems 306a, 306b may enable parsing Ethernet packets such as the packets in FIGS. 2A through 2C, and may enable decrypting, and/or stripping headers/trailers/ICVs from IPsec secured datagrams.

The edge nodes 304a, 304b may comprise suitable logic, circuitry, and/or code that may enable receiving, processing, and/or transmitting one or more of the packets and/or datagrams illustrated in FIGS. 1A through 2C. In this regard, the nodes 304a and 304b may represent boundaries between a network utilizing IPsec security and a network utilizing MACsec security. In other embodiments of the invention, IPsec and MACsec networks may overlap and nodes may implement both.

The core node 308 may comprise suitable logic, circuitry, and/or code that may enable receiving, processing, and/or transmitting one or more of the packets and/or datagrams illustrated in FIGS. 1A through 2C.

In operation of the exemplary network 300, the end system 306a may generate a message that may be securely transmitted, utilizing an SA, to the end system 306b. In this regard, the end system 306a may generate an IPsec secured datagram such as the datagram 101b, 101c, 103b, or 103c; the end system 306a may encapsulate the datagram in an Ethernet packet such as the packet 200a or 200b; and the end system 306a may transmit the packet into the network 300.

The edge node 304a may receive and process the packet comprising an IPsec secured payload and may decrypt and/or remove the IPsec header/trailer/ICV from the payload of the packet. In order to remove the IPsec encryption and formatting, the edge node 304a may have knowledge of the keys/information associated with the SA utilized to secure datagrams transmitted between end systems 306a and 306b. In this regard, the edge node 304a may obtain the keys through a number of methods which comprise but are not limited to manual configuration of the keys, establishing a secure connection to the host 306a to obtain the keys, and utilizing Tunneling Endpoint Discovery. Upon stripping the IPsec encryption and/or formatting, the edge node 304a may then perform processing which may comprise making decisions pertaining to filtering, forwarding, and/or tunneling, and may be based on the Layer 3, and/or other layers, information comprising the IP datagram payload. Additionally, the edge node 304a may encapsulate the resulting "standard" IP datagram in a MACsec secured Ethernet packet, such as the packet 200c, and may forward the packet. The MACsec secured packet may be generated based on, for example, key information and/or other configuration data distributed by MACsec enabled network nodes. In various embodiments of the invention, a MACsec secured packet may be generated based on a known relationship between an IPsec session and a MACsec session. In this regard, a mapping may exist between an IPsec tuple (which may include security protocol identifier, a destination IP address, and/or a security parameter index) and a MACsec secure channel identifier, and this mapping may be utilized to, for example, lookup encryption keys for a MACsec session.

The core node 308 may receive and process the MACsec secured Ethernet packet. In this regard, the core node 308 may decrypt and or remove MACsec formatting from the received packet, resulting in an Ethernet packet such as the packet 200a or 200b. The core node 308 may then perform processing which may comprise making decisions pertaining to filtering, forwarding, and/or tunneling, and may be based on the Layer 3 information comprising the IP datagram payload. In this regard, since the IPsec encryption and/or formatting may have been removed by the edge node 304a, the core node 308, which may not be IPsec compatible, may parse the IP datagram and process it accordingly. Upon completion of this processing, the core node 308 may add MACsec formatting and/or encryption to the packet before forwarding the packet.

The edge node 304b may receive and process the MACsec secured Ethernet packet. In this regard, the edge node 304b may decrypt and or remove MACsec formatting from the received packets, resulting in an Ethernet packet such as the packet 200a or 200b. The edge node may then perform any processing of the packet which may include making decisions pertaining to filtering, forwarding, and/or tunneling. Upon completion of this processing, the edge node 304b may add IPsec encryption and/or formatting of the payload before transmitting the packet into the network. In order to add the IPsec authentication, encryption and/or formatting, the edge node 304b may have knowledge of the keys/information associated with the SA utilized to secure datagrams transmitted between end systems 306a and 306b. In this regard, the edge node 304b may obtain the keys through a number of methods which may comprise but are not limited to manual configuration of the keys, establishing a secure connection to the host 306b to obtain the keys, and utilizing Tunneling Endpoint Discovery. In various embodiments of the invention, a IPsec secured packet may be generated based on a known relationship between an IPsec session and a MACsec session. In this regard, a mapping may exist between an IPsec tuple (which may include security protocol identifier, a destination IP address, and/or a security parameter index) and a MACsec secure channel identifier, and this mapping may be utilized to, for example, lookup encryption keys for an IPsec session.

Upon receiving the Ethernet packet comprising an IPsec secured datagram, the end system 306b may utilize the established keys to decrypt and/or remove the IPsec formatting from the datagram. Thus the security of the transmitted information has been maintained while traversing the network 300 from end system 306a to end system 306b via a non IPsec enabled core node 308.

The network 300 illustrates only one exemplary configuration of a network that utilizes both MACsec and IPsec protocols. In this regard, the network may comprise any number of end systems, nodes, and/or links. Moreover, MACsec and/or IPsec may be utilized in any or all of the end systems, nodes, and/or links without deviating from the scope of the invention. For example, the end systems 306 may transmit MACsec packets, the edge nodes 304 may convert from MACsec to IPSec, and the core node may process packets comprising IPsec encrypted payloads.

In another embodiment of the invention, network nodes may not remove IPsec formatting and/or encryption. For example, an IPsec enabled node may forward a standard Ethernet frame comprising an IPsec secured payload to a non-IPsec enabled node. The non-IPsec enabled node may parse the standard Ethernet frame without altering/parsing the IPsec secured payload and may forward the frame to an IPsec enabled destination node. Accordingly, the IPsec enabled destination node may parse the IPsec secured payload of the received frame. In this manner, an IPsec secured datagram may "tunnel" through a non-IPsec enabled network cloud while still being secured utilizing MACsec protocols.

In another embodiment of the invention, MACsec packets may "tunnel" through non-MACsec network nodes. In this regard, details of tunneling MACsec secured packets through non-MACsec enabled nodes may be found in U.S. patent application Ser. No. 11/685,554 filed on Mar. 13, 2007, which is hereby incorporated herein by reference.

Figure 3B:
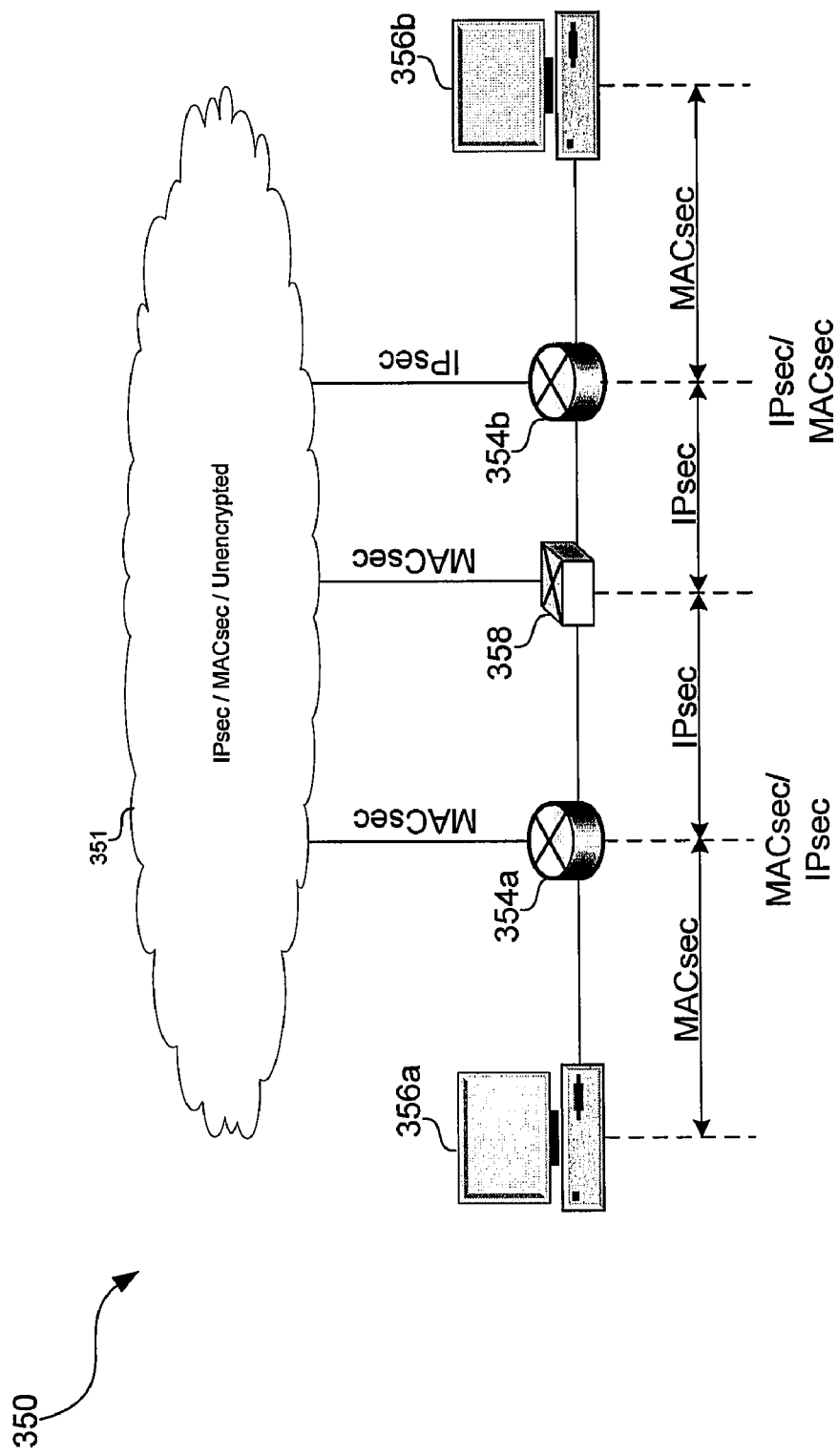
FIG. 3B is a diagram of an exemplary network utilizing both MACsec and IPsec protocols, in accordance with an embodiment of the invention.

FIG. 3B is a diagram of an exemplary network 300 utilizing both MACsec and IPsec protocols, in accordance with an embodiment of the invention. In this regard, operation of the various components of the network 350 may be similar to or the same as those disclosed in FIG. 3A. In this regard, the end systems 356 may be similar to or the same as the end systems 306, the edge nodes 354 may be similar to or the same as the edge nodes 304, and the core node 358 may be similar to or the same as the core node 308. The network portion 351 may comprise any number of network nodes and/or links, each of which may transmit and/or receive MACsec secured packets, Packets comprising IPsec secured payloads, and/or standard Ethernet packets security. Aspects of the invention may enable traffic to traverse a multi-standard network or series of networks which do not necessarily utilize a common security protocol or even any security protocol. At each hop along a network path, aspects of the invention may enable determining a security protocol utilized along a previous hop and a protocol to be utilized for a next hop. In this manner, any combination or arrangement of MACsec and IPSec nodes and/or networks may be utilized for conveying traffic from a source to a destination.

Figure 4:
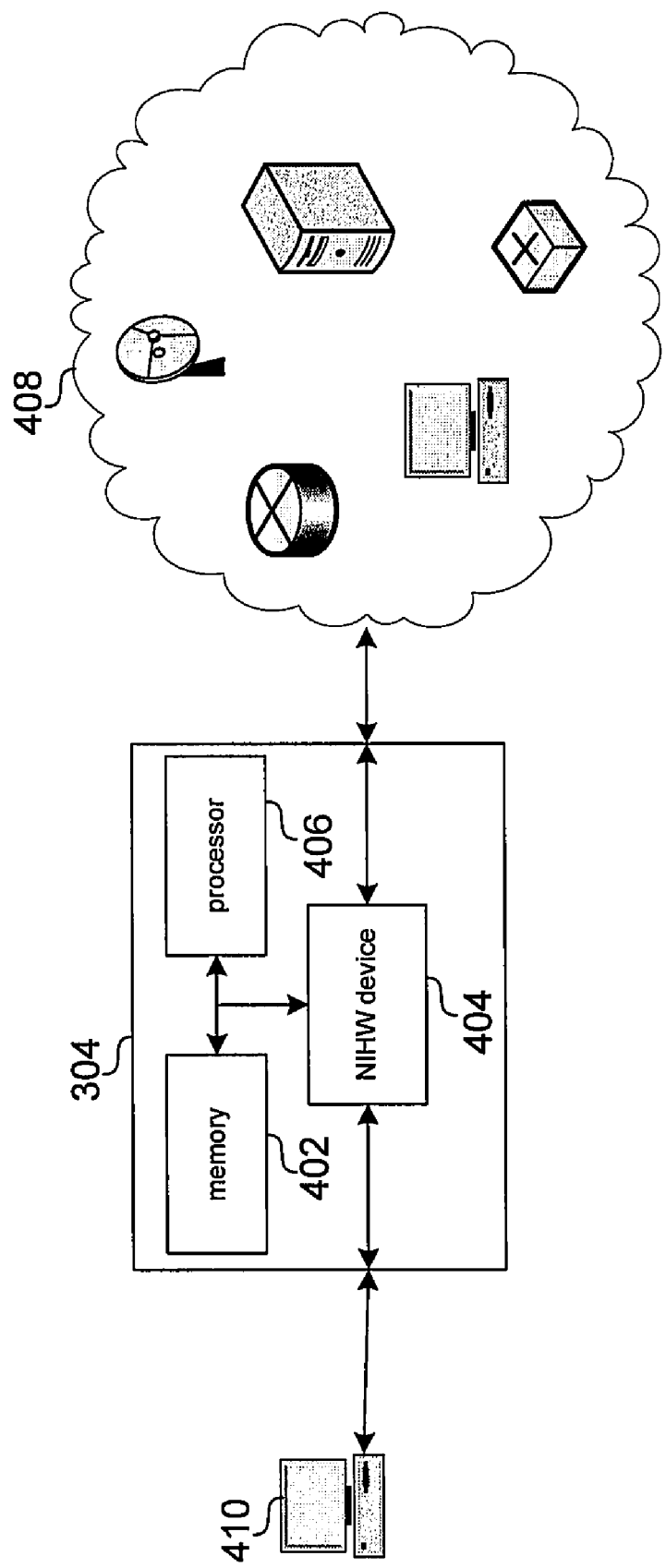
FIG. 4 is a block diagram of an edge node, in accordance with an embodiment of the invention.

FIG. 4 is a block diagram of an exemplary edge node such as the edge node, in accordance with an embodiment of the invention. Referring to FIG. 4, the edge node 304 may comprise a memory 402, a network interface hardware (NIHW) device 404, and a processor 406.

The memory 402 may comprise suitable logic, circuitry, and/or code that may enable storing information utilized for processing packets. In this regard, the memory 402 may enable storing keys, encryption protocols, and other information, which may be utilized by the end system 410 and by nodes comprising the network 408.

The processor 406 may comprise suitable logic, circuitry, and/or code that may enable interfacing with the memory 402 and the NIHW device 404 to receive, process, and forward packets. In this regard, the processor 406 may provide control signals and/or instructions to the memory 402 and the NIHW device 404 that may enable the node 304 to receive and transmit packets in the formats described in the packets 200a, 200b, and 200c of FIG. 2. The processor 406 may also provide control signals and/or instructions to the memory 402 and the NIHW device 404 that may enable the node 304 to process IP datagrams such as the datagrams in FIGS. 1A through 1C. In this regard the processor 406 may enable encryption, decryption, and parsing/formatting IP datagrams.

The NIHW device 404 may comprise suitable logic, circuitry, and/or code that may enable reception and/or transmission of packets in a network. In this regard, the NIHW device 404 may enable reception and/or transmission of bits over a physical medium and may enable communicating the received bits to the processor 406 and/or the memory 402. In various embodiments of the invention, the NIHW device 404 may comprise a processor similar to or the same as the processor 406 and may thus perform some or all of the operations described herein as being performed by the processor 406.

In operation of the exemplary node 304, a packet may arrive at the node 304 in the form of a bit-stream over a physical medium. The NIHW device 404 may receive the bits and communicate them to the processor 406 and/or the memory 402. The processor 406 may parse the Ethertype field of the received packet and may determine if the packet comprises a MACSec packet, such as the packet 200c. If the packet is determined to be MACsec secured, then the processor may parse and process the packet accordingly. The processor may also parse the packet to determine whether the payload may comprise an IPsec secured datagram. It the payload is IPsec secured, the processor 406 may perform the necessary functions to obtain the keys to remove IPsec formatting and/or encryption from the packet. In this regard, the keys, or information utilized to obtain the keys, may be stored in the memory 402.

When a packet is to be forwarded to the network 408, the processor 406 may add MACsec encryption and/or formatting to the packet before the NIHW device 404 transmits the packet to the network. In this regard, the processor may look up necessary information in the memory 402 to properly encrypt and/or format the MACsec secured packet.

When a packet is received from the network 408 and is destined for the end system 410, the processor 406 may secure the payload of the packet to be transmitted utilizing IPsec protocols. In this regard, the processor 406 may look up necessary keys, and other information in the memory 402 to properly encrypt and/or format the packet before the NIHW device 402 transmits the packet to the end system 410.

Figure 5:
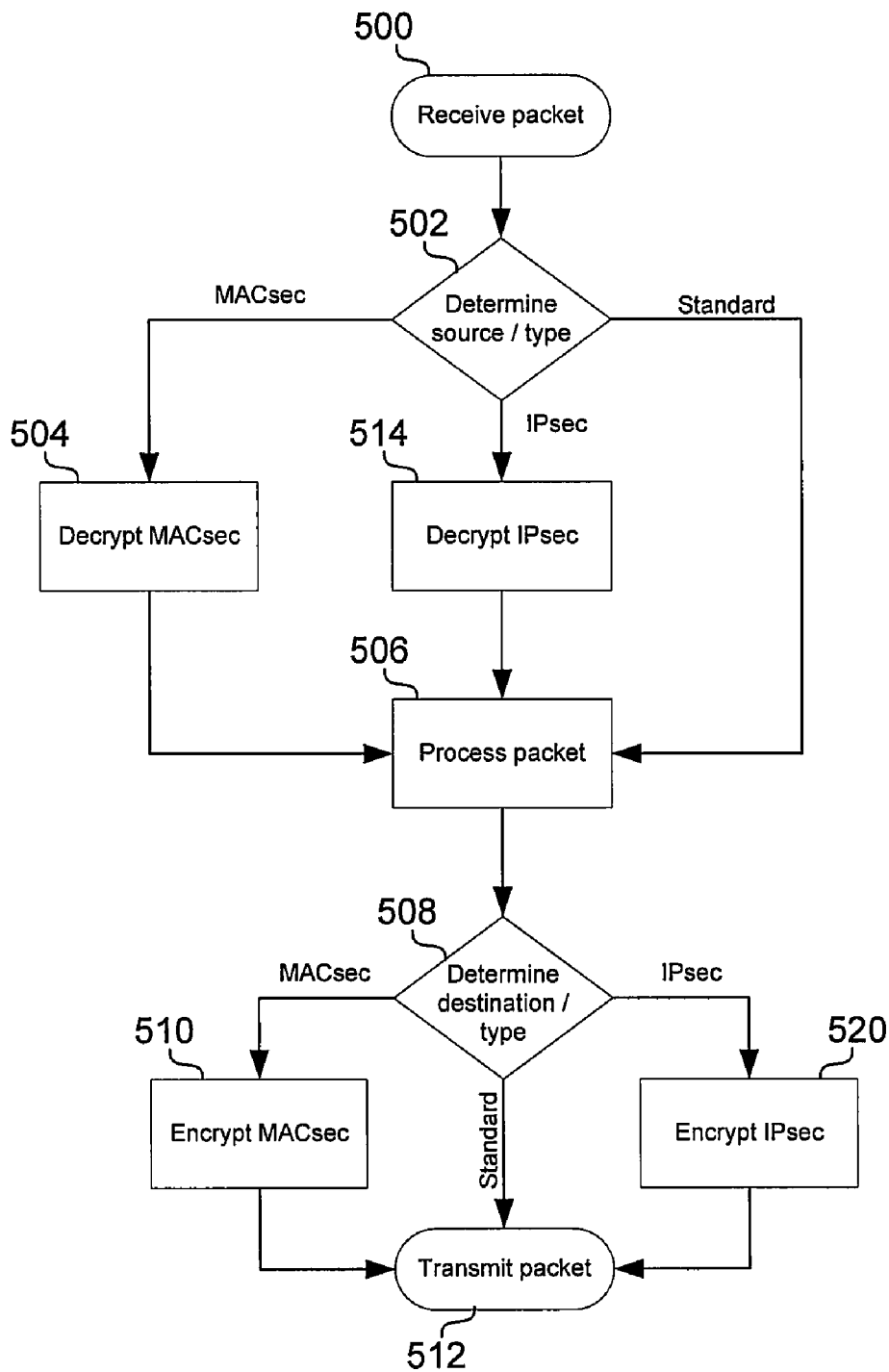
FIG. 5 is a flow chart illustrating exemplary steps in that may be utilized securing a network utilizing IPsec and MACsec protocols, in accordance with an embodiment of the invention.

In various embodiments of the invention, a hardware configuration of a network node 304 may be different than depicted in FIG. 5 without deviating from the scope of the present invention. In this regard, functions described herein as being performed by the processor 406, the NIHW 404, and/or the memory 402 may be performed and/or integrated into one or more different hardware blocks.

FIG. 5 is a flow chart illustrating exemplary steps that may be utilized by a network node, such as the node 304 of FIG. 3, in securing a network utilizing IPsec and MACsec protocols, in accordance with an embodiment of the invention. Referring to FIG. 5, the steps may start with step 500 when a packet is received at the node. In step 502, the type of packet received may be determined. In this regard, the node 304 may parse the packet and identify the information comprising the packet based on a number of fields including but not limited to Ethertype and protocol/next header fields.

In step 502, if the packet is determined to be an Ethernet frame a MACsec secured packet, then in step 504, the packet may be authenticated, decrypted, and/or re-formatted. In step 506, processing of the packet may be done. Step 506 may comprise making determinations pertaining to filtering, forwarding, and/or tunneling of the packet. Subsequent to step 506, step 508 may be executed, where it may be determined whether the packet is to be forwarded as a packet comprising an IPsec secured payload, as a MACsec secured Ethernet packet, and/or as a standard Ethernet packet. If the packet is to be forwarded as a MACsec secured Ethernet packet, in step 510, the packet may be encrypted and headers may be added. Subsequent to step 510, step 512 may be executed, where the packet may be transmitted into a network, such as the network 300.

Returning to step 508, if the packet is to be forwarded as an Ethernet packet with IPsec secured payload, then in step 520 the payload may be encrypted and/or authenticated and headers may be added before the process advances to the previously described step 512.

Returning again to step 508, if the packet is to be forwarded as a standard Ethernet packet, then in step 512 the un-encrypted and/or unsecured packet may be transmitted into the network Returning to step 502, if the packet is determined to comprise an IPsec secured payload, then in step 514, the IPsec secured payload may be authenticated, decrypted, and/or re-formatted. The previously described step 506 may then be executed.

Returning again to step 502, if the packet is determined to comprise a standard Ethernet frame, then the exemplary steps may advance to the previously described step 506.

Figure 6:
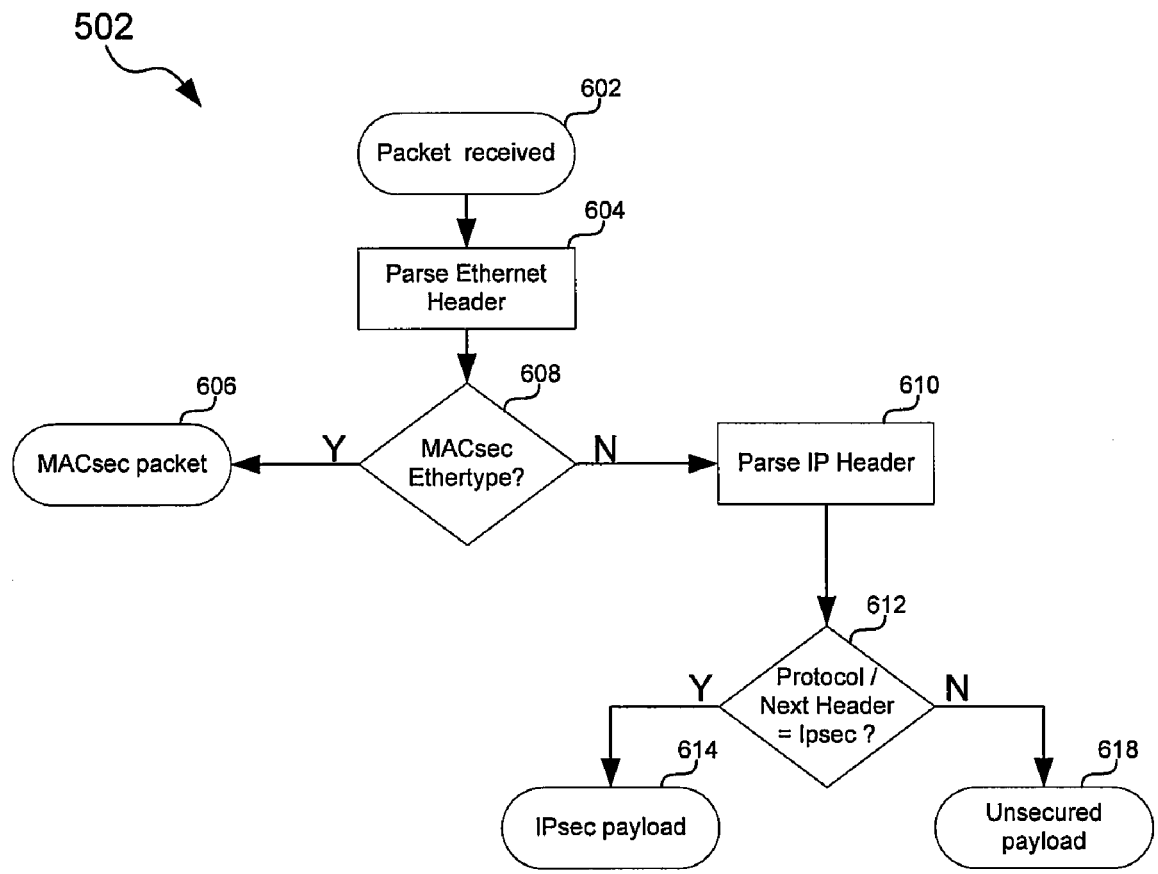
FIG. 6 is a flow chart illustrating exemplary steps that may be utilized in determining a format of a received packet, in accordance with an embodiment of the invention.

FIG. 6 is a flow chart illustrating exemplary steps that may be utilized in determining the format of a received packet, in accordance with an embodiment of the invention. In this regard, the exemplary steps in FIG. 6 may describe the step 502 disclosed in FIG. 5. Referring to FIG. 6, the steps may begin with step 602 when a packet is received at a node, such as the node 304. Next, in step 604, the packet header may be parsed to determine the Ethertype. If the Ethertype indicates that the packet is a MACsec packet, then in step 606 the node may determine that the received packet is a MACsec packet and may process the packet accordingly.

Returning to step 608, if the packet does not comprise a MACsec Ethertype, then in step 610 the header of the IP datagram payload may be parsed. Subsequently, in step 612, it may be determined whether the protocol (IPv4) or one of the next header (IPv6) fields indicates that the IP datagram is IPsec formatted/encrypted. In this regard, if the protocol/next header field comprises a value equal to 50 or 51, for example, then in step 614 the node may determine that the received packet comprises an IPsec secured payload and may process the packet accordingly. However, this invention is not so limited as to prevent the rare case where options are used with IPv4], which may be indicated by IPv4 header length and option parsing.

Returning to step 612 the protocol/next header field may not comprise a value of 50 or 51 and in step 618 the node may determine that the received packet does not comprise an IPsec secured payload. In this regard, values of 50 or 51 may be typical and/or standard values; however, the invention is not limited in this regard and any values could be established and used to identify IPsec protocols being in use.

In various other embodiments of the invention, an Ethernet packet, may contain information suitable for the creation and/or processing of packets secured utilizing IPsec, MACsec, or other security protocols. Accordingly, a packet may be secured utilizing IPsec protocols, MACsec protocols, or some combination/adaptation thereof.

Figure 7:
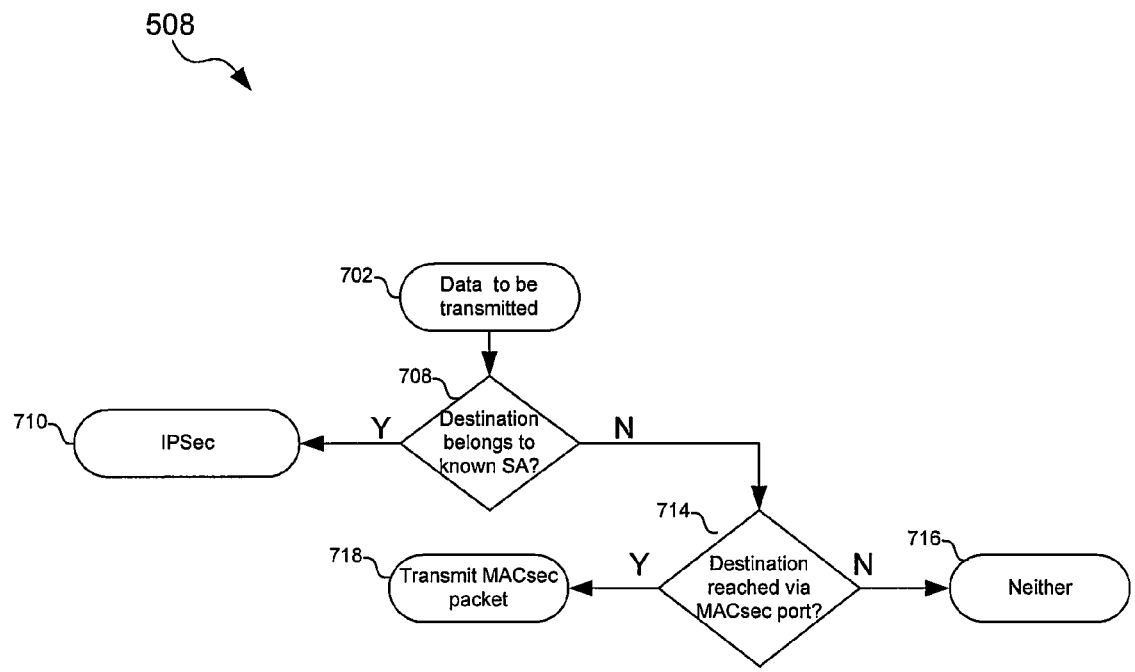
FIG. 7 is a flow chart illustrating exemplary steps that may be utilized in determining a format in which to transmit a packet, in accordance with an embodiment of the invention.

FIG. 7 is a flow chart illustrating exemplary steps that may be utilized in determining a format in which to forward a packet, in accordance with an embodiment of the invention. In this regard, the exemplary steps in FIG. 7 may describe the step 508 disclosed in FIG. 5. Referring to FIG. 7, the steps may begin with step 702 when a data is ready to be transmitted. Next, in step 708, it may be determined whether an IPSec data base or information such as an SA, exists between the source of the data and the destination for the data. If an SA exists, then in step 710, it may be determined that IPsec protocols are to be used when packetizing and transmitting the data.

If, however, information on both IPsec and MACsec is present in the data base or any other structure containing the node's required behavior for security, then the packet may have both IPsec and MACsec.

Returning to step 708, if an SA does not exist, then in step 714, it may be determined whether the destination node is MACsec enabled. In this regard, a discovery protocol, management entity/protocol, database, or memory block, such as the memory block 402 disclosed in FIG. 4, may be utilized to determine the MACsec compatibility of the destination. If the data is to be transmitted via a MACsec enabled port/interface, then in step 718 it may be determined that MACsec protocols are to be used when packetizing and transmitting the data.

Returning to step 714, if the destination is determined to be non-MACsec enabled, then in step 716 it may be determined that a secure transmission utilizing MACsec and/or IPsec protocols may not be possible. In this regard, a node such as the node 304 disclosed in FIG. 4 may, for example, make a determination as to whether the data may be transmitted unsecured or whether the data may be dropped.

In various other embodiments of the invention, a data structure comprising information similar to an SA, may contain information suitable for the creation and/or processing of packets secured utilizing IPsec, MACsec, or other security protocols. Accordingly, a packet may be secured utilizing IPsec protocols, MACsec protocols, or some combination/adaptation thereof.

Aspects of the invention may be found in a method and system for converting between Ethernet packets secured using MACsec protocols, such as the packet 200c, and Ethernet packets comprising payloads secured using IPsec protocols, such as the datagrams 101b, 101c, 103b, and 103c. Accordingly, aspects of the invention may enable determining whether packets are secured using MACsec protocols based on a unique Ethertype, comprising the packet's header. In this regard, the Ethertype may be similar to or the same as the Ethertype field 214 of FIG. 2B. It may also be determined whether packet payloads are secured utilizing IPsec protocols based on the "protocol" field comprising IPv4 datagram headers and/or the "next header" field comprising IPv6 datagram headers. In this regard, the "protocol" and "next header" fields may be as disclosed in FIGS. 1C, 1D, 1E, and 1F. In one embodiment, an IPsec connection may be terminated at a first network node, such as the node 304a of FIG. 3A and the IPsec connection may be regenerated at a second network node, such as the node 304c of FIG. 3A. In this manner, various security protocols may be utilized to secure various portions of a network. The conversion may be based on a data structure, such as an SA, stored by and/or accessible to the network nodes. Boundaries between networks utilizing different security protocols may be discovered and may enable determining which network nodes need to perform a conversion. Additionally, aspects of the invention may enable securing data utilizing MACsec protocols when tunneling IPsec secured data through non-IPsec enabled nodes.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for computer networking, the method comprising:
performing by one or more processors, one or more circuits, or a combination of one or more processors and one or more circuits in a first network node:
determining information of a security association between a second network node and a third network node;
determining, utilizing said information, a mapping between Ethernet packets comprising payloads secured utilizing IPsec protocols and Ethernet packets secured utilizing MACsec protocols; and
converting, utilizing said information mapping, between said Ethernet packets comprising payloads secured utilizing IPsec protocols and said Ethernet packets secured utilizing MACsec protocols;
wherein said payloads secured utilizing IPsec protocols are
[i] de-capsulated by removal of IPsec headers and trailer from said payloads secured utilizing IPsec protocols and
[ii] decrypted in instances that said payloads secured utilizing IPsec protocols are encrypted;
whereby a payload of each converted Ethernet packets secured utilizing MACsec protocols is not secured utilizing IPsec protocols.

2. The method according to claim 1, comprising:
wherein, in a fourth network node, said converted Ethernet packets secured utilizing MACsec protocols are converted back to said Ethernet packets comprising payloads secured utilizing IPsec protocols.

3. The method according to claim 1, comprising terminating an IPSec connection in said first network node via said converting, wherein:
said Ethernet packets comprising payloads secured utilizing IPsec protocols are transmitted over said IPsec connection; and
said IPsec connection is secured utilizing said security association between said second network node and said third network node.

4. The method according to claim 3, wherein a fourth network node determines said information of said security association and regenerates said terminated IPsec connection utilizing said information.

5. The method according to claim 1, comprising detecting whether a particular Ethernet packet is one of said Ethernet packets secured utilizing MACsec protocols based on an Ethertype of said particular Ethernet packet.

6. The method according to claim 1, comprising detecting whether a particular Ethernet packet is one of said Ethernet packets comprising payloads secured utilizing IPsec protocols based on a protocol field and/or a next header field of said particular Ethernet packet.

7. The method according to claim 1, wherein:
said mapping maps between an IPSec tuple and a MACsec secure channel identifier; and
said mapping is stored in a data structure stored in said first network node.

8. The method according to claim 1, comprising determining whether said converting is necessary for a particular Ethernet packet based on security protocols supported by a source and/or a destination of said particular Ethernet packet.

9. The method according to claim 1 comprising discovering network boundaries between security protocols.

10. The method according to claim 9, comprising determining whether to perform said converting based on said discovery of said boundaries.

11. The method according to claim 1, wherein said converting enables securing a payload of one of said Ethernet frames comprising IPsec secured payloads while concurrently enabling a non IPsec enabled node to parse said payload.

12. A non-transitory machine readable storage having stored thereon a computer program having at least one code section for networking, the at least one code section being executable by a machine for causing the machine to perform steps comprising:
in a first network node, determining information of a security association between a second network node and a third network node; and
determining, based on said determined information, a mapping between said Ethernet packets comprising payloads secured utilizing IPsec protocols and said Ethernet packets secured utilizing MACsec protocols;
converting, utilizing said mapping, between Ethernet packets comprising payloads secured utilizing IPsec protocols and Ethernet packets secured utilizing MACsec protocols;
wherein said payloads secured utilizing IPsec protocols are decapsulated by removal of IPsec headers and trailer from said payloads secured utilizing IPsec protocols and
decrypted in instances that said payloads secured utilizing IPsec protocols are encrypted;
whereby a payload of each converted Ethernet packet secured utilizing MACsec protocols is not secured utilizing IPsec protocols.

13. The non-transitory machine readable storage according to claim 12, wherein
a fourth network node converts said converted Ethernet packets secured utilizing MACsec protocols back to said Ethernet packets comprising payloads secured utilizing IPsec protocols.

14. The non-transitory machine readable storage according to claim 12, wherein:
said Ethernet packets comprising payloads secured utilizing IPsec protocols are transmitted over an IPsec connection;
said at least one code section comprises code for terminating said IPSec connection in said first network node via said converting; and
said IPsec connection is secured utilizing said security association between said second network node and said third network node.

15. The non-transitory machine readable storage according to claim 14, wherein a fourth network node regenerates said terminated IPsec connection utilizing said information.

16. The non-transitory machine readable storage according to claim 12, wherein said at least one code section comprises code for detecting whether a particular Ethernet packet is one of said Ethernet packets secured utilizing MACsec protocols based on an Ethertype of said particular Ethernet packet.

17. The non-transitory machine readable storage according to claim 12, wherein said at least one code section comprises code for detecting whether a particular Ethernet packet is one of said Ethernet packets comprising payloads secured utilizing IPsec protocols based on a protocol field and/or a next header field of said particular Ethernet packet.

18. The non-transitory machine readable storage according to claim 12, wherein:
 said mapping maps between an IPSec tuple and a MACsec secure channel identifier; and
 said mapping is stored in a data structure stored in said first network node.

19. The non-transitory machine readable storage according to claim 12, wherein said at least one code section comprises code for determining whether said converting is necessary for a particular Ethernet packet based on a source and/or a destination of said particular Ethernet packet.

20. The non-transitory machine readable storage according to claim 12, wherein said at least one code section comprises code for discovering network boundaries between security protocols.

21. The non-transitory machine readable storage according to claim 20, wherein said at least one code section comprises code for determining whether to perform said converting based on said discovery of said boundaries.

22. The non-transitory machine readable storage according to claim 12, wherein said converting enables securing a payload of one of said Ethernet frames comprising IPsec secured payloads while concurrently enabling a non IPsec enabled node to parse said payload.

23. A system for computer networking, the system comprising:
 one or more circuits and/or processors for use in a first network node, said one or more circuits and/or processors being operable to:
 determine information of a security association between a second network node and a third network node; and
 determine, based on said determined information, a mapping between said Ethernet packets comprising payloads secured utilizing IPsec protocols and said Ethernet packets secured utilizing MACsec protocols;
 convert, utilizing said mapping, between Ethernet packets comprising payloads secured utilizing IPsec protocols and Ethernet packets secured utilizing MACsec protocols;
 wherein said payloads secured utilizing IPsec protocols are decapsulated by removal of IPsec headers and trailer from said payloads secured utilizing IPsec protocols and decrypted in instances that said payloads secured utilizing IPsec protocols are encrypted;
 whereby a payload of each converted Ethernet packet secured utilizing MACsec protocols is not secured utilizing IPsec protocols.

24. The system according to claim 23,
 wherein, at a fourth network node, said converted Ethernet packets secured utilizing MACsec protocols are converted back to said Ethernet packets comprising payloads secured utilizing IPsec protocols.

25. The system according to claim 23, wherein:
 said Ethernet packets comprising payloads secured utilizing IPsec protocols are transmitted over an IPsec connection;
 said one or more circuits and/or processors are operable to terminate said IPSec connection via said converting; and
 said IPsec connection is secured utilizing said security association between said second network node and said third network node.

26. The system according to claim 25, wherein a fourth network node regenerates said terminated IPsec connection utilizing said information.

27. The system according to claim 23, wherein said one or more circuits and/or processors are operable to detect whether a particular Ethernet packet is one of said Ethernet packets secured utilizing MACsec protocols based on an Ethertype of said particular Ethernet packet.

28. The system according to claim 23, wherein said one or more circuits and/or processors are operable to detect whether a particular Ethernet packet is one of said Ethernet packets comprising payloads secured utilizing IPsec protocols based on a protocol field and/or a next header field of said particular Ethernet packet.

29. The system according to claim 23, wherein:
 said mapping maps between an IPSec tuple and a MACsec secure channel identifier; and
 said mapping is stored in a data structure stored in said first network node.

30. The system according to claim 23, wherein said one or more circuits and/or processors are operable to determine whether said converting is necessary for a particular Ethernet packet based on a source and/or a destination of said particular Ethernet packet.

31. The system according to claim 23, wherein said one or more circuits and/or processors are operable to discover network boundaries between security protocols.

32. The system according to claim 31, wherein said one or more circuits and/or processors are operable to determine whether to perform said converting based on said discovery of said boundaries.

33. The system according to claim 23, wherein said converting enables securing a payload of one of said Ethernet frames comprising IPsec secured payloads while concurrently enabling a non IPsec enabled node to parse said payload.

34. A method for computer networking, the method comprising:
 performing by one or more processors and/or one or more circuits in a first network node:
 determining information of a security association between a second network node and a third network node; and
 determining, based on said determined information, a mapping between said Ethernet packets comprising payloads secured utilizing IPsec protocols and said Ethernet packets secured utilizing MACsec protocols;
 converting, utilizing said mapping, between Ethernet packets comprising payloads secured utilizing IPsec protocols and Ethernet packets secured utilizing MACsec protocols, wherein said converting comprises:
 removing MACsec headers and trailers from said Ethernet packets secured utilizing MACsec protocols; and
 decrypting said Ethernet packets secured utilizing MACsec protocols in instances that said Ethernet packets secured utilizing MACsec protocols are encrypted;
 whereby each converted Ethernet packet comprising a payload secured utilizing IPSec packets is not secured utilizing MACsec protocols.

35. The method according to claim 34, wherein:
 said mapping maps between an IPSec tuple and a MACsec secure channel identifier; and
 said mapping is stored in a data structure stored in said first network node.

36. The method according to claim 34, wherein, in a fourth network node, said converted Ethernet packets comprising payloads secured utilizing IPsec protocols are converted back to said Ethernet packets secured utilizing MACsec protocols.

37. The method according to claim 34, comprising regenerating an IPSec connection in said first network node via said converting, wherein:
 said Ethernet packets comprising payloads secured utilizing IPsec protocols are transmitted over said IPsec connection; and said IPsec connection is secured utilizing said security association between said second network node and said third network node.

38. The method according to claim 37, wherein a fourth network node determines said information of said security association and terminates said IPsec connection utilizing said information.

39. The method according to claim 34, comprising detecting whether a particular Ethernet packet is one of said Ethernet packets secured utilizing MACsec protocols based on an Ethertype of said particular Ethernet packet.

40. The method according to claim 34, comprising detecting whether a particular Ethernet packet is one of said Ethernet packets comprising payloads secured utilizing IPsec protocols based on a protocol field and/or a next header field of said particular Ethernet packet.

41. The method according to claim 34, comprising determining whether said converting is necessary for a particular Ethernet packet based on security protocols supported by a source and/or a destination of said particular Ethernet packet.

42. The method according to claim 34, comprising discovering network boundaries between security protocols.

43. The method according to claim 42, comprising determining whether to perform said converting based on said discovery of said boundaries.

44. The method according to claim 34, wherein said converting enables securing a payload of one of said Ethernet frames comprising IPsec secured payloads while concurrently enabling a non IPsec enabled node to parse said payload.

45. A non-transitory machine readable storage having stored thereon a computer program having at least one code section for networking, the at least one code section being executable by a machine for causing the machine to perform steps comprising:
   in a first network node, determining information of a security association between a second network node and a third network node; and
   determining, based on said determined information, a mapping between said Ethernet packets comprising payloads secured utilizing IPsec protocols and said Ethernet packets secured utilizing MACsec protocols;
   converting, utilizing said mapping, between Ethernet packets comprising payloads secured utilizing IPsec protocols and Ethernet packets secured utilizing MACsec protocols, wherein said converting comprises:
      removing MACsec headers and trailers from said Ethernet packets secured utilizing MACsec protocols; and
      decrypting said Ethernet packets secured utilizing MACsec protocols in instances that said Ethernet packets secured utilizing MACsec protocols are encrypted;
   whereby each converted Ethernet packet comprising a payload secured utilizing IPSec packets is not secured utilizing MACsec protocols.

46. The non-transitory machine readable storage according to claim 45, wherein:
   said mapping maps between an IPSec tuple and a MACsec secure channel identifier; and
   said mapping is stored in a data structure stored in said first network node.

47. The non-transitory machine readable storage according to claim 45, wherein, in a fourth network node, said converted Ethernet packets comprising payloads secured utilizing IPsec protocols are converted back to said Ethernet packets secured utilizing MACsec protocols.

48. The non-transitory machine readable storage according to claim 45, wherein:
   said at least one code section comprises code for regenerating an IPSec connection in said first network node via said converting;
   said Ethernet packets comprising payloads secured utilizing IPsec protocols are transmitted over said IPsec connection; and
   said IPsec connection is secured utilizing said security association between said second network node and said third network node.

49. The non-transitory machine readable storage according to claim 48, wherein a fourth network node determines said information of said security association and terminates said IPsec connection utilizing said information.

50. The non-transitory machine readable storage according to claim 48, wherein said at least one code section comprises code for detecting whether a particular Ethernet packet is one of said Ethernet packets secured utilizing MACsec protocols based on an Ethertype of said particular Ethernet packet.

51. The non-transitory machine readable storage according to claim 48, wherein said at least one code section comprises code for detecting whether a particular Ethernet packet is one of said Ethernet packets comprising payloads secured utilizing IPsec protocols based on a protocol field and/or a next header field of said particular Ethernet packet.

52. The non-transitory machine readable storage according to claim 45, wherein said at least one code section comprises code for determining whether said converting is necessary for a particular Ethernet packet based on security protocols supported by a source and/or a destination of said particular Ethernet packet.

53. The non-transitory machine readable storage according to claim 45, wherein said at least one code section comprises code for discovering network boundaries between security protocols.

54. The non-transitory machine readable storage according to claim 53, wherein said at least one code section comprises code for determining whether to perform said converting based on said discovery of said boundaries.

55. The non-transitory machine readable storage according to claim 45, wherein said converting enables securing a payload of one of said Ethernet frames comprising IPsec secured payloads while concurrently enabling a non IPsec enabled node to parse said payload.

56. A system for computer networking, the system comprising:
   one or more circuits and/or processors for use in a first network node, said one or more circuits and/or processors being operable to:
   determine information of a security association between a second network node and a third network node; and
   determine, based on said determined information, a mapping between said Ethernet packets comprising payloads secured utilizing IPsec protocols and said Ethernet packets secured utilizing MACsec protocols;
   convert, utilizing said mapping, between Ethernet packets comprising payloads secured utilizing IPsec protocols and Ethernet packets secured utilizing MACsec protocols, wherein said conversion comprises:
      removing MACsec headers and trailers from said Ethernet packets secured utilizing MACsec protocols; and
      decrypting said Ethernet packets secured utilizing MACsec protocols in instances that said Ethernet packets secured utilizing MACsec protocols are encrypted;

whereby each converted Ethernet packet comprising a payload secured utilizing IPSec packets is not secured utilizing MACsec protocols.

57. The system according to claim 56, wherein:
said mapping maps between an IPSec tuple and a MACsec secure channel identifier; and
said mapping is stored in a data structure stored in said first network node.

58. The system according to claim 56, wherein, in a fourth network node, said converted Ethernet packets comprising payloads secured utilizing IPsec protocols are converted back to said Ethernet packets secured utilizing MACsec protocols.

59. The system according to claim 56, wherein said one or more circuits and/or processors are operable to:
regenerate an IPSec connection in said first network node via said converting;
said Ethernet packets comprising payloads secured utilizing IPsec protocols are transmitted over said IPsec connection; and
said IPsec connection is secured utilizing said security association between said second network node and said third network node.

60. The system according to claim 59, wherein a fourth network node determines said information of said security association and terminates said IPsec connection utilizing said information.

61. The system according to claim 56, comprising detecting whether a particular Ethernet packet is one of said Ethernet packets secured utilizing MACsec protocols based on an Ethertype of said particular Ethernet packet.

62. The system according to claim 56, comprising detecting whether a particular Ethernet packet is one of said Ethernet packets comprising payloads secured utilizing IPsec protocols based on a protocol field and/or a next header field of said particular Ethernet packet.

63. The system according to claim 56, comprising determining whether said converting is necessary for a particular Ethernet packet based on security protocols supported by a source and/or a destination of said particular Ethernet packet.

64. The system according to claim 56, comprising discovering network boundaries between security protocols.

65. The system according to claim 64, comprising determining whether to perform said conversion based on said discovery of said boundaries.

66. The system according to claim 56, wherein said conversion enables securing a payload of one of said Ethernet frames comprising IPsec secured payloads while concurrently enabling a non IPsec enabled node to parse said payload.

* * * * *